May 1, 1928. Re. 16,949

T. GASKINS, JR

ROACH EXTERMINATOR

Original Filed May 13. 1925

Thomas Gaskins, Jr.,
INVENTOR

BY Victor J. Evans
ATTORNEY

P. A. Hickey.
WITNESS:

Reissued May 1, 1928. Re. 16,949

UNITED STATES PATENT OFFICE.

THOMAS GASKINS, JR., OF ARCADIA, FLORIDA, ASSIGNOR TO DE SOTO CHEMICAL COMPANY, OF ARCADIA, FLORIDA.

ROACH EXTERMINATOR.

Original No. 1,566,199, dated December 15, 1925, Serial No. 30,039, filed May 13, 1925. Application for reissue filed October 17, 1927. Serial No. 226,780.

The object of this invention is the provision of a roach exterminator of a size and shape to be conveniently positioned in a trunk, closet or any other place infested by roaches and of a shape and strength to withstand pressure of clothes or other articles thereagainst and in which such articles will not interfere with the free passage of the pests to the bait in the exterminator.

A still further object is the provision of a roach exterminator whose body is of tubular formation and which may be constructed of cardboard or other suitable material and which has its sides provided with openings adjacent the bottom of the tube, the bait being arranged in the bottom of said tube which adds weight to the said bottom, whereby the body will at all times sustain itself in position to arrange the bait conveniently for the insects who may enter the body from either the end or side passages therein. A number of unobstructed entrances are thus provided which are spaced above the support upon which the exterminator may rest.

A still further object is the provision of a device for this purpose which may be cheaply constructed, easily manufactured and profitably marketed, and which is of such construction that the entrance passages therethrough cannot be clogged by trash brought by the insects or by dead insects.

To the attainment of the foregoing and other objects which will appear as the nature of the invention is better understood, reference is to be had to the drawings which accompany and form part of this application.

In the drawings:—

Figure 1:
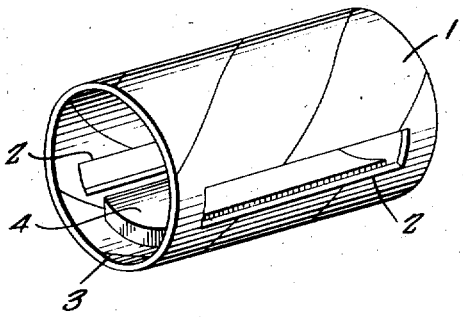
Figure 1 is a perspective view of the improvement.
Figure 2:
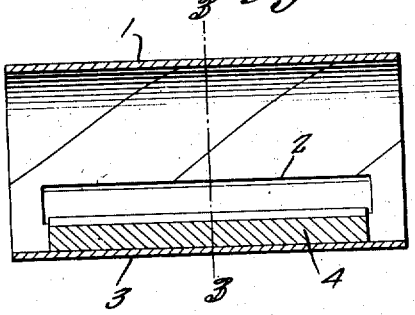
Figure 2 is a substantially central vertical longitudinal sectional view therethrough.
Figure 3:
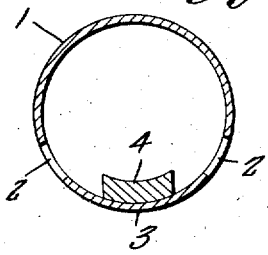
Figure 3 is a sectional view on the line 3—3 of Figure 2.

As disclosed in the drawings the body 1 of the improvement is of tubular formation. The body is preferably formed of cardboard twisted spirally in the manner usual in the construction of paper mailing tubes. The body is comparatively small in size, being only about two inches long and of a little more than an inch in diameter. The twisted cardboard renders the body light and strong, but of course, the body may be formed of other material. The body 1 has its sides adjacent to what I will term the bottom thereof, provided with longitudinally extending, oppositely disposed, substantially rectangular openings 2. These openings are located at one side of the diametrical center of the body and terminate at points sufficiently away from the ends of the body as to not materially decrease the strength of the said body.

The bottom of the body is indicated for distinction by the numeral 3, and has arranged on the inner face thereof a substantially rectangular cake or a number of layers of a poisoned food 4, which may be in the nature of a mash, gum or any other poison containing moisture. If desired, the food or poison 4 may be arranged in a receptacle therefor on the bottom 3, but in any event the bottom 3 is moisture-proof.

Because of the weight added by the poison to the bottom of the body the device will be at all times retained in the position illustrated by the figures of the drawing, that is, the body will rest on its bottom. The open ends of the body and the openings 2 in the sides thereof provide entrance passages for insects. Because of its tubular formation and the arrangement of the passages and relative position of the bait, these passages through the body are at all times open, even when the device is arranged in a trunk or other receptacle and has clothes or other objects pressed thereagainst. Further, the poisonous food or bait is kept from contact with the clothes. The body is of a strength to withstand such pressure, and as the poison 4 is practically concealed in the body liability of its being eaten by children or pets is greatly reduced.

The improvement not only withstands the pressure of clothes or other articles but prevents the same from becoming soiled by contact with the poisonous food therein, the cake of poisonous material is of one thick layer and is in the nature of a gum which contains moisture. The gum does not contain sufficient poison to harm a human being or houshold pet, but is very efficient in destroying roaches or other insects. This poisonous food is manufactured by the inventor and the device with the food therein is marketed in its entirety.

The simplicity and advantages of my improvement will, it is thought, be perfectly apparent to those skilled in the art to which the invention relates, when the foregoing description is read in connection with the accompanying drawings.

Having described the invention, I claim:

1. A roach or other insect exterminator, comprising a body of a comparatively short length of tubing, said body having diametrically opposed longitudinal openings in the sides thereof which terminate away from the open ends of the tube, adjacent the bottom thereof, and having arranged therein a longitudinally extending cake of poisonous food, and by virtue of whose weight the body is at all times sustained in one position.

2. An insect exterminator comprising a tubular body having openings therein, a poisonous food located within the body and fixed with respect to the openings and designed to maintain the tube in one position.

3. An insect exterminator comprising a tubular body having openings in opposite sides, and a poisonous food secured to the inner wall of the tube between the openings and designed to maintain the tube in one position.

In testimony whereof I hereunto affix my signature.

THOMAS GASKINS, Jr.